United States Patent Office.

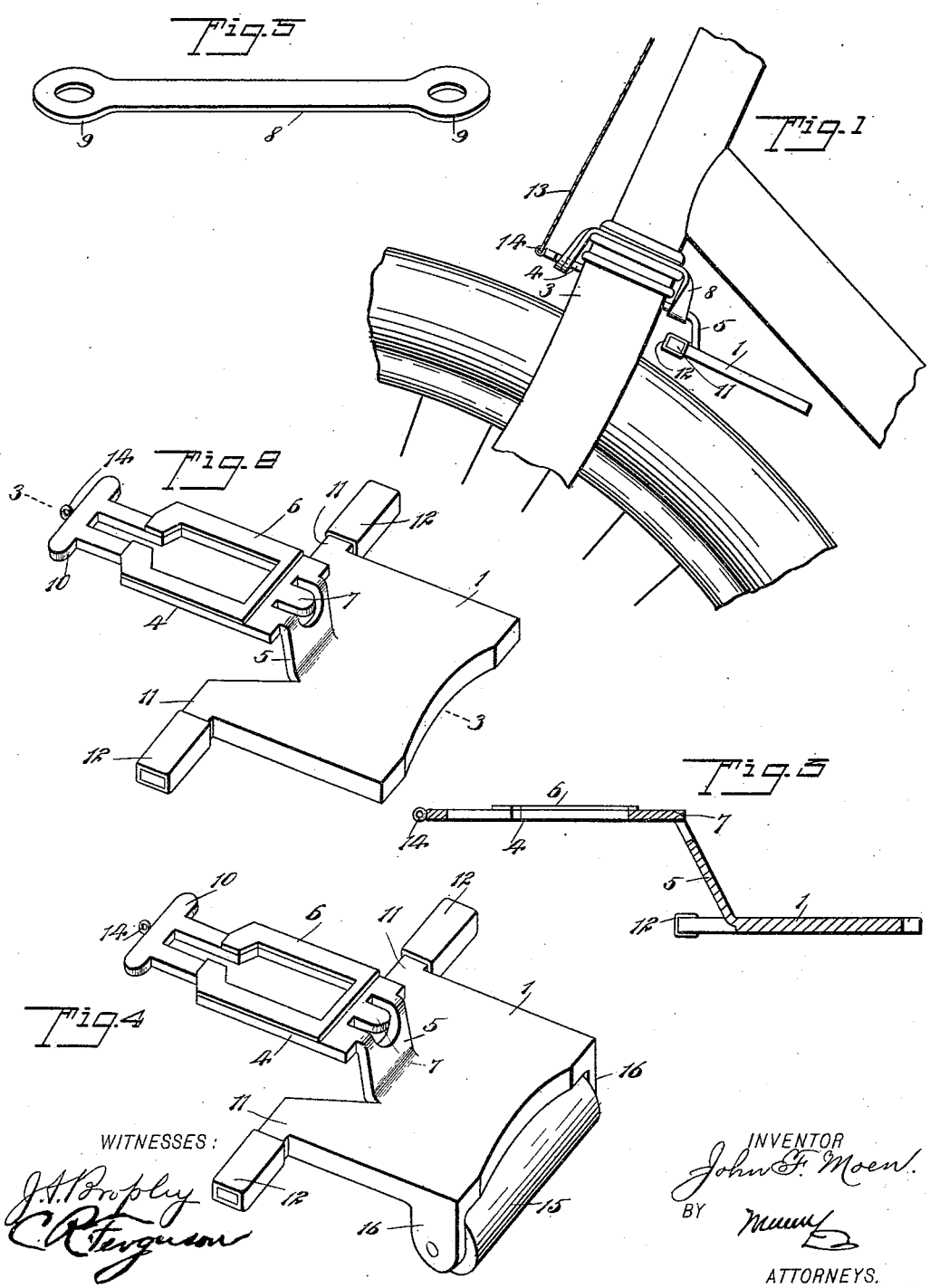

JOHN FRANCIS MOEN, OF NEW YORK, N. Y.

BICYCLE-BRAKE.

SPECIFICATION forming part of Letters Patent No. 640,681, dated January 2, 1900.

Application filed March 15, 1899. Serial No. 709,170. (No model.)

*To all whom it may concern:*

Be it known that I, JOHN FRANCIS MOEN, of the city of New York, borough of Brooklyn, in the county of Kings and State of New York, have invented a new and Improved Bicycle-Brake, of which the following is a full, clear, and exact description.

This invention relates to improvements in brakes for bicycles; and the object is to provide a brake of simple and comparatively cheap construction that may be readily and quickly applied to a bicycle without the use of clamps or screws.

I will describe a bicycle-brake embodying my invention and then point out the novel features in the appended claims.

Reference is to be had to the accompanying drawings, forming a part of this specification, in which similar characters of reference indicate corresponding parts in all the figures.

Figure 1 is a side view of a brake embodying my invention and showing the same as applied to a bicycle. Fig. 2 is a perspective view of the brake. Fig. 3 is a section on the line 3 3 of Fig. 2. Fig. 4 is a perspective view showing a modification, and Fig. 5 is a perspective view of an elastic holding device employed.

The brake comprises a plate or shoe 1, of any suitable material, and this brake is designed to be detachably secured to the front fork 3 of the bicycle. It is provided with a shank portion 4, connected to the shoe 1 by a curved piece 5. This shank 4 is designed to engage in the crown of the fork 3, and to prevent scratching or damaging the enamel I may attach a rubber cushion 6 to the top of the shank, and for the sake of lightness I have shown the shank as made of skeleton form.

At the junction of the shank 4 and the portion 5 is a tongue 7, with which a supporting yielding holding device is designed to be engaged. For this holding device I may employ an ordinary endless rubber band. Preferably, however, I use a band, as indicated in Fig. 5, which consists of a body portion 8, having the ends 9 enlarged and provided with holes or openings. In attaching the brake the shank portion is to be placed underneath the crown of the fork, and then the center of the body portion of the elastic holding device is to be passed over the top of the fork-tongue 7. Then the ends of the holding device are carried out laterally underneath the shank and then carried over the upper end of the fork 3, and then the apertured portions of the holding device are to be passed over the cross-head 10 on the end of the shank 4, as plainly indicated in Fig. 1.

To prevent the shoe 1 from being forced forward between the members of the fork 3 by the force of the front wheel of the bicycle engaging the said brake-shoe, I provide it with laterally-extended arms 11, which will engage with the rear sides of the fork members when forward pressure is applied on the brake, and thus prevent the brake from sliding from between the fork members, and to prevent the marring of the enamel rubber covers 12 may be placed on the arms 11.

In operation when a rider desires to apply the brake on the front wheel of the bicycle he places his foot on the plate or shoe 1 and presses it downward upon the wheel. Of course upon releasing the pressure the brake will be returned to its upper position by means of the elastic connecting device. If desired to operate the brake by hand, a cord 13 may be connected to an eye 14 on the forward end of the shank 4 and said cord extended upward to a convenient place upon the handle-bar of the bicycle.

In Fig. 4 I have shown the brake-shoe as in the form of a roller 15, having journal-bearings in downward extensions 16 on the plate or shoe 1. While I have shown the holding device and described it in the form of a rubber band, it is obvious that a coiled spring may be used in lieu thereof; but obviously an ordinary rubber band will be found most convenient, as one may be obtained very readily, and should one be broken the loss will be slight.

Having thus fully described my invention, I claim as new and desire to secure by Letters Patent—

1. A bicycle-brake, comprising a plate or shoe, a shank extended forward from the plate or shoe and adapted to engage with the crown portion of the front fork of a bicycle, and a band, elastic in the direction of its length for detachably securing the brake to the fork, substantially as specified.

2. A bicycle-brake, comprising a plate or shoe adapted to be moved into engagement with the front wheel of the bicycle, a shank extended forward from said plate or shoe, a tongue at the rear end of said shank, and a head at the forward end of the shank, and a rubber band for engaging with said tongue and also engaging over the head, the said band being passed over the crown portion of the fork, substantially as specified.

3. A bicycle-brake, comprising a plate or shoe adapted to be pressed into engagement with the front wheel of a bicycle, a shank extended forward from said plate or shoe, an elastic band for securing the said shank to the front fork of a bicycle, and arms extended laterally from the plate or shoe to prevent its being forced between the members of the front fork, substantially as specified.

4. A bicycle-brake, comprising a plate or shoe, laterally-extending arms on said plate or shoe, yielding covers on said arms, a shank extended forward of the plate or shoe, a yielding cushion on the top surface of said shank, a tongue at the rear end of the shank, a head at the forward end of the shank, and a rubber band for engaging the said tongue and with the shank rearward of its head, for securing the device to the bicycle-frame fork, substantially as specified.

JOHN FRANCIS MOEN.

Witnesses:
DAVID KRAUS,
J. H. ALLEN.